April 20, 1948.  R. G. FEAR  2,439,968
EXPANSIBLE REAMER
Filed Sept. 13, 1943
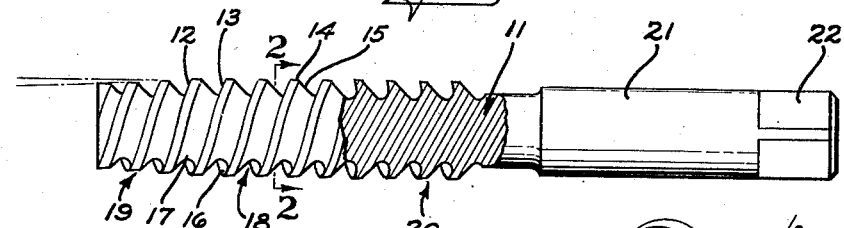
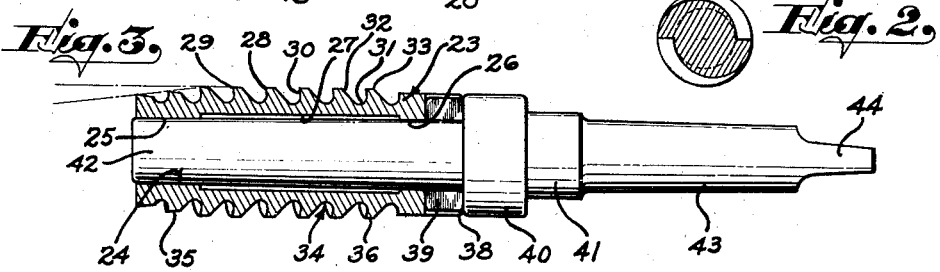
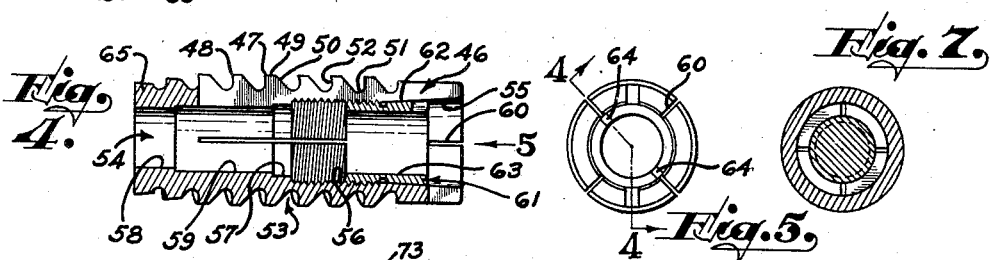
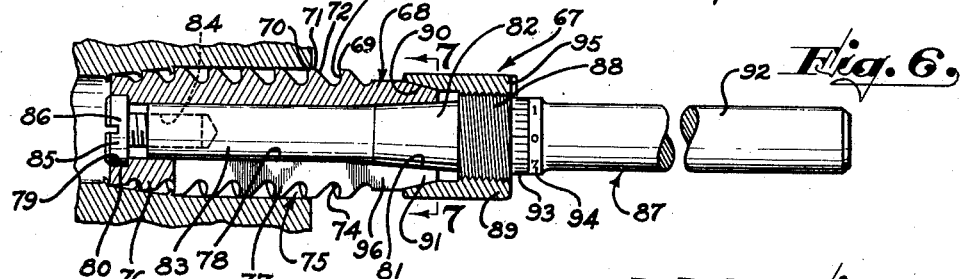
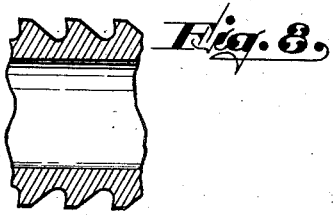
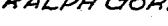
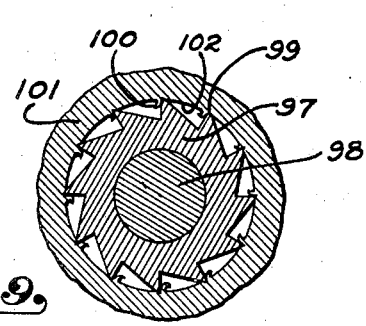
INVENTOR
RALPH GORDON FEAR
BY HARRIS, KIECH, FOSTER & HARRIS
FOR THE FIRM
ATTORNEYS Patented Apr. 20, 1948

2,439,968

UNITED STATES PATENT OFFICE 2,439,968

EXPANSIBLE REAMER

Ralph Gordon Fear, Reseda, Calif.

Application September 13, 1943, Serial No. 502,147

6 Claims. (Cl. 77—76)

My invention relates to a cutting tool, and, since it was first incorporated in reamers and broaches, such embodiments of my invention will be hereinafter described in detail, and the objects and advantages of my invention incorporated in such embodiments will be hereinafter set forth so that those skilled in the art may readily incorporate my invention in other embodiments of cutting tools.

One of the objects of my invention is the provision of a reamer in which the cutting edges are so formed as to subject the work to a true shearing action as contrasted with the pressural scraping or wiping of the metal from the work as performed by conventional reamers, whereby a perfectly round, smooth and true surface is cut, and gouging, tearing, or biting of the surface of the work is prevented even if the fibers of the work are not lengthwise of the reamed hole, as for example in steel tubing of the welded type.

Another object of my invention is to provide a reamer in which the cutting edges may be formed as a thread by turning in a lathe, thus eliminating the expensive milling operation commonly used to manufacture reamers.

Another object of my invention is to provide a reamer which may be sharpened in a lathe simply by rotating the reamer and maintaining an abrasive stone against the dulled cutter surface.

Another object of my invention is to provide a reamer having an effective length of cutting edge substantially in excess of that of prior reamers so that the effective length of cutting edge operative at one time is substantially increased. This substantial increase in the effective length of the cutting edge, together with the formation of the cutting edge so that it exerts a shearing instead of a scraping action, provides a reamer capable of removing more metal per unit of time and per operation than conventional reamers, while at the same time prolonging the effective life of the tool.

Among the other objects of my invention is the provision of a reamer having the cutting edge and the flutes so formed that the metal is removed from the work by shearing action, and the cut metal is removed from the work, thus avoiding distortion of the cut surface by the compressive deformation of the metal and by galling due to the passage of the cut metal particles between the lands or cutting edges and the cut surface of the work.

Still another object of my invention is the provision of a reamer which may be readily expanded over a wider range of diameters than conventional reamers in order to compensate for wear, while limiting the expansion to the rearward portion of the tool so that the forward pilot portion remains unchanged and continues its function of guiding the reamer in the work.

Another object of my invention is the provision of a reamer having lands and cutting edges diametrically opposed so that the workman can readily measure the diameter of the tool with a micrometer.

It is also an object of my invention to provide a reamer which is expansible, as hereinbefore described, and which has means carried by the tool itself for indicating to the workman the exact degree of expansion of the tool secured for each of its adjusted positions, thus enabling the workman, after determining the diameter of the reamer with a micrometer, to quickly and accurately adjust the tool to the desired diameter.

Embodiments of my invention capable of performing the foregoing objects and providing such advantages are described in the following specification, which may be better understood by reference to the accompanying drawing. In the drawing, which is for illustrative purposes only, Fig. 1 is a side elevational view partially sectioned of a hand reamer embodying my invention;

Fig. 2 is a vertical sectional view taken as indicated by the line 2—2 of Fig. 1;

Fig. 3 is a side elevational view partially sectioned of a rose reamer of the shell type embodying my invention;

Fig. 4 is a vertical sectional view of an expansible shell reamer, the section being taken as indicated by the broken line 4—4 of Fig. 5;

Fig. 5 is an end view of the reamer illustrated in Fig. 4 taken as indicated by the arrow 5;

Fig. 6 is a vertical sectional view of an expansible shell reamer during its cutting operation;

Fig. 7 is a sectional view taken as indicated by the line 7—7 of Fig. 6;

Fig. 8 is an enlarged fragmentary vertical sectional view of the shell reamer illustrated in Fig. 6; and Fig. 9 is a transverse sectional view of a conventional fluted reamer during its cutting operation.

Referring to the drawing, which is for illustrative purposes only, the numeral 11 indicates a tool body provided with two cutting edges 12 and 13 projecting from and helically disposed relative to the tool body 11 in the form of a thread. The cutting edges may be in the form of a single or multiple thread, the cutting edges 12 and 13 being illustrated as a double thread of substantially the form of a buttress thread. The provision of the cutting edges in the form of a thread permits them to be cut upon a lathe and obviates the necessity of forming the tool with an expensive milling operation. Adjacent each of the cutting edges 12 and 13 is the usual land 14 intersecting a tooth back 15 which is connected to a tooth face 16 of an adjacent tooth through a fillet 17. Each tooth back 15 with its connected tooth face 16 and fillet 17 provides a flute 18.

The tool body 11 and cutting edges 12 and 13 include a forward portion 19 and a rearward portion 20. Over the forward portion 19 the cutting edges 12 and 13 may be spiralled and forwardly tapered, the amount and length of this taper depending upon the size of the reamer and the character of work for which it is intended. In a reamer of 3/4 inch diameter intended for work upon steel such taper may be of the order of .02 inch per inch for 1/2 inch or more. Over the rearward portion 20 the cutting edges 12 and 13 are formed of constant diameter. It will be noted that the lands 14 and cutting edges 12 and 13 are so formed that they are diametrically opposed throughout their length, thus permitting the workman to readily determine the diameter at various points along the tool body 11 by the use of a micrometer.

It will be noted also that the cutting edges 12 and 13 are so formed as to make an acute angle with the intersected plane which is normal to the axis of the tool body 11. By forming the tool so that this angle is small, the cutting edges 12 and 13 and the tool body 11 during the cutting operation are subjected to compression stresses substantially circumferentially of the tool body instead of axially thereof, and the cutting edges 12 and 13 are caused to exert upon the work with which they are in contact a true shearing or peeling action, removing a layer of material, such as metal, from the work with the minimum energy and leaving the cut surface smooth. Such a shearing or peeling action is radically different from the action of a conventional reamer having its cutting edges at an angle approximating 90 degrees, which action constitutes a pressural scraping or wiping action removing a layer of material, such as metal, from the work by compressing it and tearing it from the work, leaving the cut surface rough. The shearing or peeling action resulting from the disposition of the cutting edges 12 and 13 at a very small angle with the intersecting plane normal to the axis of the tool body 11 removes a layer of material from the work without any pressural deformation of the work, even though the work be formed of a comparatively resilient metal, such as bronze, so that an absolutely true hole is formed, whereas with the conventional reamer removing the metal by compression of the work temporary deformation of the article being cut causes movement of the cut surface after the passage of the cutting edge therefrom, resulting in an untrue hole.

The hand reamer illustrated in Fig. 1 includes a shank 21 having at its rearward end a portion 22 with its outline in the form of a polygon for reception of a chuck of a conventional actuating device adapted for rotating the reamer.

The flutes 18 are made of sufficient depth to receive the material cut from the work, and the formation of the flutes in a right-hand direction around the tool body 11 facilitates the feeding of the cut metal forwardly of the hole in the work by the right-hand rotation of the reamer so that the cut metal is effectively removed from proximity to the cut surface, eliminating all danger of its passage between the lands 14 or the cutting edges 12 and 13 and the surface of the work, and thus preventing the galling or scratching of the cut surface. Further to insure against such galling or scratching of the cut surface the lands 14 are tapered inwardly and rearwardly of the tool body 11 to provide the suitable clearance angle, and, to cause the cutting edges to cut more smoothly, the tooth faces 16 and cutting edges 12 and 13 are given a small rake, such for example as 7 to 8 degrees for the first one-third or one-half of the length of the reamer. The balance is cylindrically ground so that it acts as a burnishing surface to completely remove any irregularities and leave a smooth surface. Only the forward portion of the cutting edges 12 and 13 need be initially sharpened, thus prolonging the life of the tool by permitting additional portions spaced rearwardly on the tool body to be successively ground as the previously sharpened portions become worn.

Illustrated in Fig. 3 is a rose reamer of the shell type, the numeral 23 indicating a tool body or shell. The tool body 23 with an axial bore 24 includes forward and rearward portions 25 and 26 flaring rearwardly of the tool body 23 and a central enlarged portion 27.

The tool body 23 is provided with cutting edges 28 and 29 similar to the cutting edges 12 and 13 previously described. The cutting edge may be in the form of a single or multiple thread. The cutting edges 28 and 29 illustrated in the drawing are helically disposed around the tool body 23 in the form of a double thread, and each of such cutting edges is connected through a tooth face 30, fillet 31, and tooth back 32 to a land 33 of an adjacent cutting edge. Here, as in the hand reamer previously described, the connected tooth face 30, fillet 31, and tooth back 32 constitute a flute 34, the tooth faces 30, lands 33, and flutes 34 being formed in the manner and for the purposes previously described.

The numerals 35 and 36 indicate a front portion and a rear portion, respectively, of the tool body 23 and the cutting edges 28 and 29. Over the front portion 35 the cutting edges 28 and 29 are spiralled and tapered forwardly of the tool body, and over the portion 36 the cutting edges 28 and 29 are made of substantially uniform diameter for the purposes described.

At its rearward end the tool body 23 is provided with radial slots 38 for the reception of lugs 39 projecting from an enlarged flange 40 formed on an arbor 41. Forwardly of the flange 40 the arbor 41 is provided with a mandrel 42 tapered forwardly in a manner to fit the flared portions 25 and 26 of the axial bore 24 in the tool body 23. Rearwardly of the flange 40 the arbor 41 is provided with a shank 43 terminating in a tang 44 adapted for reception in a suitable actuating machine for rotating the reamer.

The cutting edges 28 and 29 are angularly related to the intersecting plane normal to the axis of the tool body 23 in the same manner as the cutting edges 12 and 13 hereinbefore described, and the operation of the reamer illustrated in Fig. 3 is similar to the operation of the reamer illustrated in Fig. 1. The formation of the reamer body 23 as a shell of course affects a substantial saving in metal.

In Fig. 4 is illustrated an expansible shell reamer, including a tool body 46. Formed on the tool body are helical cutting edges 47 and 48, the adjacent cutting edges being connected by a land 49, tooth back 50, fillet 51, and tooth face 52, the connected tooth face, fillet, and tooth back defining a flute 53, all as previously described.

The tool body 46 is provided with an axial bore 54 having a rearwardly flared portion 55 at its rearward end and adjacent thereto an enlarged threaded portion 56. Adjacent the enlarged threaded portion 56 the bore 54 is provided with a rearward cylindrical portion 57, and at its forward end the bore 54 is provided with a rearwardly flared portion 58, these two portions being connected by an intermediate cylindrical portion 59.

Extending through the tool body 46 is a plurality of slots 60, illustrated in Fig. 5 as four in number and symmetrically disposed around the tool body 46. Each of the slots 60 extends from the rearward end of the tool body 46 to adjacent its forward end. As illustrated in the drawing, these slots may extend throughout approximately three-fourths of the length of the tool body 46 and are for the purpose of permitting radial expansion of the rearward portion of the tool body.

Threaded into the enlarged threaded portion 56 of the tool body 46 is an expander plug 61. This plug 61 is provided with a rearward tapered portion 62 engaging the flared portion 55 of the bore 54 to expand the tool body 46 as the expander plug 61 is threaded into the tool body.

The expander plug 61 is provided with a rearwardly flared bore 63 cooperating with the flared portion 58 of the bore 54 to receive a tapered mandrel, such as the mandrel 42, on a suitable arbor for supporting the tool body 46 during its rotation by a suitable actuating machine.

The expander plug 61 is provided with diametrically opposed slots 64 in its rearward end for the reception of a suitable tool to effect its rotation relative to the tool body 46. The progressive increase in the diameter of the portions 58, 59, and 57 rearwardly of the tool body 46 facilitates the expansion of the tool body 46 to a progressively and substantially uniformly greater extent from the forward end of the slots 60 to the rearward end of the tool body 46. Since the slots 60 do not extend to the forward end of the tool body 46, it will be seen that the expansion of the rearward portion of the tool body by expander plug 64 therein causes no expansion of the forward portion indicated by the numeral 65 which remains at its original dimension for the continued performance of its function as a cutter and pilot.

The numeral 67 of Fig. 6 indicates generally a reamer of another embodiment of a shell type reamer of my invention. The reamer 67 includes a tool body 68 having formed thereon helical cutting edges 69 and 70. The cutting edges may be formed as a single thread or as multiple threads, those illustrated in the drawing being formed as a double thread. Cutting edges 69 and 70 are connected by a land 71, a tooth back 72, and a tooth face 73 of the form and dimensions similar to those described in Fig. 1. Each land 71 and connected tooth back 72 and tooth front 73 define a flute 75. The tool body 68 has a forward portion 76 forwardly tapered over which the cutting edges 69 and 70 may be also tapered and helically arranged.

The tool body 68 includes also a rearward portion 77 of substantially uniform diameter, the cutting edges 69 and 70 being likewise of substantially uniform diameter.

The tool body 68 is provided with an axial bore 78 having an enlarged portion 79 at its forward end providing an annular shoulder 80. At its rearward end the bore 78 includes a flared portion 81 for the reception of a tapered portion 82 of a mandrel 83. The mandrel 83 extends to adjacent the forward end of the tool body 68 and is provided with a threaded axial bore 84. Threaded into the bore 84 is an adjusting screw 85 having a head 86 which is received within the enlarged portion 79 of the bore 78 and engages the annular shoulder 80 of the tool body 68.

The mandrel 83 is a part of an arbor 87 which is provided rearwardly of the tapered portion 82 with a threaded portion 88. A collar 89 is secured upon the threaded portion 88 and provides a forwardly flared bore 90 adapted for engaging a rearwardly tapered portion 91 of the tool body 68 at its forward end. Rearwardly of the threaded portion 88 the arbor 87 provides a shank 92 for reception in a chuck of a suitable actuating machine for rotating the reamer 67.

Formed on the shank 92 adjacent the threaded portion 88 is a scale 93 and indicia or numbers 94, and formed on the rearward end of the collar 89 is indicia for cooperating with the scale 93 and indicia 94. The indicia upon the collar 89 may be an arrow, groove, scratch, or projection 95 radially disposed to indicate upon the scale 93 and with the numbers 94 the degree or extent of relative rotation of the collar 89 and the arbor 87. A plurality of slots 96 similar to the slots previously described are formed in the tool body 68 terminating short of its forward end.

With the tool assembled as illustrated and described, if it is desired to expand the rearward portion 77 of the tool body 68 and the cutting edges 69 and 70, the collar 89 is rotated rearwardly on the threaded portion 88 to the desired extent, and thereafter the locking screw 85 is rotated to move the tool body 68 rearwardly on the arbor 87. This rearward movement is continued until the tool body 68 is securely locked upon the mandrel 83 between the head 86 of the locking screw 85 and the flared bore 90 of the collar 89. During such movement of the tool body 68, the engagement of the forwardly tapered portion 82 of the mandrel 83 with the flared bore 81 of the tool body 68 causes the expansion of the tool body 68 of its rearward portion 77. The pitch of the threads of the threaded portion 88 of the mandrel 83 and the cooperating threads of the collar 89 and the degree of taper of the tapered portion 82 of the mandrel and the cooperating flared bore 81 of the tool body 68 are so related that relative rotation of the collar 89 and arbor 87 to a predetermined extent accomplishes the expansion of the rearward ends of the cutting edges 69 and 70 to an exact predetermined degree.

The degree of expansion per given unit of rotation of the collar 89 upon the arbor 87 measured diametrically, radially, or circumferentially in any desired units is represented by the scale 93 and the numbers 94. A workman, having measured the diameter of the cutting edges 69 and 70 and knowing the change in diameter desired for his purpose, can by the cooperating projection 95, scale 93, and numbers 94 rotate the collar 89 upon the arbor 87 the exact extent required for securing this precise change in such diameter.

As illustrated in Fig. 9 a conventional reamer includes a tool body 97 of the shell type mounted upon a mandrel 98, the tool body 97 being provided with cutting edges 99 which are substantially parallel with the axis of the tool body 97. During the rotation of the tool therefore each of the cutting edges 99 removes a layer 100 of metal from the work 101 by purely compressive force, pushing or shoving upon the layer to accomplish its separation from the work by a tearing or scraping action. Such an action inevitably leaves the cut surface 102 of the work pitted, roughened, and scuffed. Furthermore, in such a process of metal removal dependent entirely upon the subjection of the work to compressive stress, there is a tendency for the work adjacent the point of contact with the cutting edges 99 to become deformed or increased in density responsive to such compression, which tendency is so marked in the case of materials having the resilient properties of bronze that the compressed portions of the work expand inwardly when the compression thereon is relieved by the passage of the cutting edge 99, thus providing a hole which is not true or of uniform dimensions.

All of the embodiments of my invention hereinbefore illustrated and described operate with that shearing or peeling action subjecting the work to the minimum of compressive stresses as described in connection with the embodiment illustrated in Fig. 1.

Preferably in the embodiments of my invention employed as reamers or broaches the rearward portion of the cutting edges over which the cutting edges are of substantially uniform diameter are made of sufficient length that the walls of the work are cut not only to the exact desired form, but they are also given a mirror finish so that the reaming or broaching and finishing are accomplished in a single operation. If desired, the cutting edges at the rearward end of the tool may be maintained dull or unsharpened and made of a slightly greater diameter than the cutting edges forwardly thereof so that in one operation of the tool the walls are cut to exactly the desired form and then burnished.

From the foregoing it will be understood that my invention may be embodied in hand reamers, fluting chucking reamers, rose chucking reamers, shell reamers, taper reamers, and various other types of reamers, push or pull broaches, milling cutters, and various other cutting tools.

While those embodiments of my invention hereinbefore described perform the objects and provide the advantages primarily stated, various modifications of such embodiments and other embodiments including my mental concept will occur to those skilled in the art from the foregoing description, and I therefore wish my invention not to be restricted to the specific forms illustrated and described, but including all those modifications and other embodiments coming within the scope of the claims which follow.

I claim as my invention:

1. In a cutting tool, the combination of: a tool body having a bore extending therethrough, said bore being flared at the rearward end of said tool body and said body having a slot in its rearward portion; a helical cutting edge projecting from said tool body, said cutting edge being formed at such an acute angle with the plane normal to the axis of said tool body as to cut a contacting surface with a shearing action; a mandrel disposed in said bore, said mandrel having a tapered portion extending into said flared bore; and means for securing said body in various positions upon said mandrel, whereby the diameter of said cutting edge on said rearward portion of said body is varied.

2. In a cutting tool, the combination of: a tool body having a bore extending therethrough, said bore being flared at the rearward end of said tool body and said body having a slot in its rearward portion; a helical cutting edge projecting from said tool body, said cutting edge being formed at such an acute angle with the plane normal to the axis of said tool body as to cut a contacting surface with a shearing action; a mandrel disposed in said bore, said mandrel having a tapered portion extending into said flared bore; means for securing said body in various positions upon said mandrel, whereby the diameter of said cutting edge on said rearward portion of said body is varied; and indicia means associated with said mandrel and indicating by the position of said body on said mandrel the degree of expansion of said body at all of its operative positions on said mandrel.

3. In a cutting tool, the combination of: a tool body having a bore therein and a slot in its rearward portion, said bore being flared at the rearward end of said body; a cutting edge extending around said tool body and angularly related to the plane normal to the axis of said body, whereby said edge cuts a contacting surface by shear; a mandrel positioned within said bore, said mandrel having a tapered portion extending into said flared bore; a locking member threaded into said mandrel against said tool body, whereby said body is advanced on said tapered portion of said mandrel; and a collar threaded upon said mandrel against said tool body and with said locking member clamping said body against movement on said mandrel.

4. In a cutting tool, the combination of: a tool body having a bore therein and a slot in its rearward portion, said bore being flared at the rearward end of said body; a cutting edge extending around said tool body and angularly related to the plane normal to the axis of said body, whereby said edge cuts a contacting surface by shear; a mandrel positioned within said bore, said mandrel having a tapered portion extending into said flared bore; a locking member threaded into said mandrel against said tool body, whereby said body is advanced on said tapered portion of said mandrel; a collar threaded upon said mandrel against said tool body and with said locking member clamping said body against movement on said mandrel; and indicia means upon said collar and said mandrel adjacent said collar, the pitch of the threaded connection of said collar and said mandrel being so related to the degree of flare of said flared bore and the degree of taper of said tapered portion of said mandrel that said indicia means indicates the degree of expansion of said body at all of its operative positions on said mandrel.

5. In a cutting tool, the combination of: a tool body having a bore therein and a slot in its rearward portion, said bore being flared at the rearward end of said body and said body having a rearwardly tapered portion at its rearward end; a cutting edge extending around said tool body and angularly related to the plane normal to the axis of said body, whereby said edge cuts a contacting surface by shear; a mandrel positioned within said bore, said mandrel having a tapered portion extending into said flared bore; a locking member threaded into said mandrel against said tool body, whereby said body is advanced on said tapered portion of said mandrel; a collar threaded upon said mandrel, said collar having a flared portion engaging said tapered portion of said tool body and with said locking member clamping said body against movement on said mandrel; and indicia means upon said collar and said mandrel adjacent said collar, the pitch of the threaded connection of said collar and said mandrel being so related to the degree of flare of said flared bore and the degree of taper of said tapered portion of said mandrel that said indicia means indicates the degree of expansion of said body at all of its operative positions on said mandrel.

6. In a cutting tool, the combination of: a tool body having a bore therein and a slot in its rearward portion, said bore being flared at the rearward end of said body and being provided with a recessed shoulder at the forward end of said body, and said body having a rearwardly tapered portion at its rearward end; a cutting edge extending around said tool body and angularly related to the plane normal to the axis of said body, whereby said edge cuts a contacting surface by shear; a mandrel positioned within said bore, said mandrel having a tapered portion extending into said flared bore; a locking screw threaded into the forward end of said mandrel against said recessed shoulder, whereby said body is advanced on said tapered portion of said mandrel, the head of said locking screw being substantially flush with the forward end of said tool body; a collar threaded upon said mandrel, said collar having a flared portion engaging said tapered portion of said tool body and with said locking member clamping said body against movement on said mandrel; and indicia means upon said collar and said mandrel adjacent said collar, the pitch of the threaded connection of said collar and said mandrel being so related to the degree of flare of said flared bore and said tapered portion of said mandrel that said indicia means indicates the degree of expansion of said body at all of its operative positions on said mandrel.

RALPH GORDON FEAR.

REFERENCES CITED

The following references are of record in the file of this patent:

UNITED STATES PATENTS

| Number | Name | Date |
|---|---|---|
| 1,210,391 | Alexander | Jan. 2, 1917 |
| 1,266,538 | Alexander | May 14, 1918 |
| 1,321,243 | Pettersen et al. | Nov. 11, 1919 |
| 1,347,740 | Hack | July 27, 1920 |
| 1,479,079 | Kutchera | Jan. 1, 1924 |
| 1,531,891 | Wetmore | Mar. 31, 1925 |
| 1,654,610 | Seiler | Jan. 3, 1928 |
| 1,697,509 | Marty, Jr. | Jan. 1, 1929 |
| 1,902,062 | Evans | Mar. 21, 1933 |
| 2,084,737 | Magnus | June 22, 1937 |
| 2,376,021 | Vosper | May 15, 1945 |

FOREIGN PATENTS

| Number | Country | Date |
|---|---|---|
| 24,300 | Great Britain | 1902 |
| 546,245 | Germany | Mar. 12, 1932 |

OTHER REFERENCES

Railway Mechanical Engineer, Mar. 1943, p. 129, "Spiral Reamer."